United States Patent
Ogawa et al.

(10) Patent No.: US 10,365,872 B2
(45) Date of Patent: Jul. 30, 2019

(54) PRINT INSTRUCTION APPARATUS AND NON-TRANSITORY COMPUTER READABLE MEDIUM

(71) Applicant: FUJI XEROX CO., LTD., Tokyo (JP)

(72) Inventors: Hirofumi Ogawa, Kanagawa (JP); Nobuki Hagiwara, Kanagawa (JP); Koichi Naito, Kanagawa (JP); Makoto Kondo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 45 days.

(21) Appl. No.: 15/484,448

(22) Filed: Apr. 11, 2017

(65) Prior Publication Data

US 2018/0101347 A1 Apr. 12, 2018

(30) Foreign Application Priority Data

Oct. 12, 2016 (JP) ................. 2016-200615

(51) Int. Cl.
*G06F 3/12* (2006.01)
*H04N 1/00* (2006.01)

(52) U.S. Cl.
CPC .......... *G06F 3/1275* (2013.01); *G06F 3/1205* (2013.01); *G06F 3/1211* (2013.01); *G06F 3/1253* (2013.01); *G06F 3/1271* (2013.01); *G06F 3/1285* (2013.01); *G06F 3/1286* (2013.01); *H04N 1/00347* (2013.01); *H04N 1/00411* (2013.01)

(58) Field of Classification Search
None
See application file for complete search history.

(56) References Cited

U.S. PATENT DOCUMENTS

2015/0331639 A1* 11/2015 Piazza .................. G06F 3/1285
358/1.14

FOREIGN PATENT DOCUMENTS

| JP | 2003-271017 A | | 9/2003 |
| JP | 2005-100234 A | | 4/2005 |
| JP | 2009163722 A | * | 7/2009 |

* cited by examiner

Primary Examiner — Fan Zhang
(74) Attorney, Agent, or Firm — Oliff PLC (57) ABSTRACT

A print instruction apparatus includes an acquiring unit that acquires basis weight class information from multiple image forming apparatuses to be selected, the basis weight class information representing information on basis weight class of recording paper set for each of the multiple image forming apparatuses, and a generating unit that generates a common basis weight classification from the acquired basis weight class information, the common basis weight classification including a basis weight class common to the multiple image forming apparatuses.

3 Claims, 12 Drawing Sheets

| IMAGE FORMING APPARATUS 4a | | IMAGE FORMING APPARATUS 4b | | IMAGE FORMING APPARATUS 4c | | SUBDIVIDING OF COMMON BASIS WEIGHT CLASSIFICATION | |
|---|---|---|---|---|---|---|---|
| BASIS WEIGHT CLASS | TRAY | BASIS WEIGHT CLASS | TRAY | BASIS WEIGHT CLASS | TRAY | | |
| HEAVY PAPER (90-122) | | HEAVY PAPER (90-106) | 1 | HEAVY PAPER (90-122) | 2 | HEAVY PAPER (90-106) | K1 |
| | | HEAVY PAPER (107-166) | 3 | | | HEAVY PAPER (107-122) | K2 |
| HEAVY PAPER (123-166) | 3 | | | HEAVY PAPER (123-177) | 3 | HEAVY PAPER (123-166) | K3 |
| | | | | | | HEAVY PAPER (167-177) | K4 |
| HEAVY PAPER (167-222) | 4 | HEAVY PAPER (167-222) | 5 | HEAVY PAPER (178-250) | 4 | HEAVY PAPER (178-222) | K5 |
| | | | | | | HEAVY PAPER (223-250) | K6 |

| IMAGE FORMING APPARATUS 4a | | IMAGE FORMING APPARATUS 4b | | IMAGE FORMING APPARATUS 4c | | SUBDIVIDING OF COMMON BASIS WEIGHT CLASSIFICATION | |
|---|---|---|---|---|---|---|---|
| BASIS WEIGHT CLASS | TRAY | BASIS WEIGHT CLASS | TRAY | BASIS WEIGHT CLASS | TRAY | | |
| HEAVY PAPER (90-122) | | HEAVY PAPER (90-106) | 1 | HEAVY PAPER (90-122) | 2 | HEAVY PAPER (90-106) | K1 |
| | | | | | | HEAVY PAPER (107-122) | K2 |
| HEAVY PAPER (123-166) | 3 | HEAVY PAPER (107-166) | 3 | HEAVY PAPER (123-177) | 3 | HEAVY PAPER (123-166) | K3 |
| | | | | | | HEAVY PAPER (167-177) | K4 |
| HEAVY PAPER (167-222) | 4 | HEAVY PAPER (167-222) | 5 | HEAVY PAPER (178-250) | 4 | HEAVY PAPER (178-222) | K5 |
| | | | | | | HEAVY PAPER (223-250) | K6 |

PRINT INSTRUCTION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-200615 filed Oct. 12, 2016.

BACKGROUND

Technical Field

The present invention relates to a print instruction apparatus and a non-transitory computer readable medium.

SUMMARY

According to an aspect of the invention, there is provided a print instruction apparatus including an acquiring unit that acquires basis weight class information from multiple image forming apparatuses to be selected, the basis weight class information representing information on basis weight class of recording paper set for each of the multiple image forming apparatuses, and a generating unit that generates a common basis weight classification from the acquired basis weight class information, the common basis weight classification including a basis weight class common to the multiple image forming apparatuses.

BRIEF DESCRIPTION OF THE DRAWINGS

Exemplary embodiments of the present invention will be described in detail based on the following figures, wherein.

DETAILED DESCRIPTION

First Exemplary Embodiment

Configuration of Print Instruction System

Figure 1:
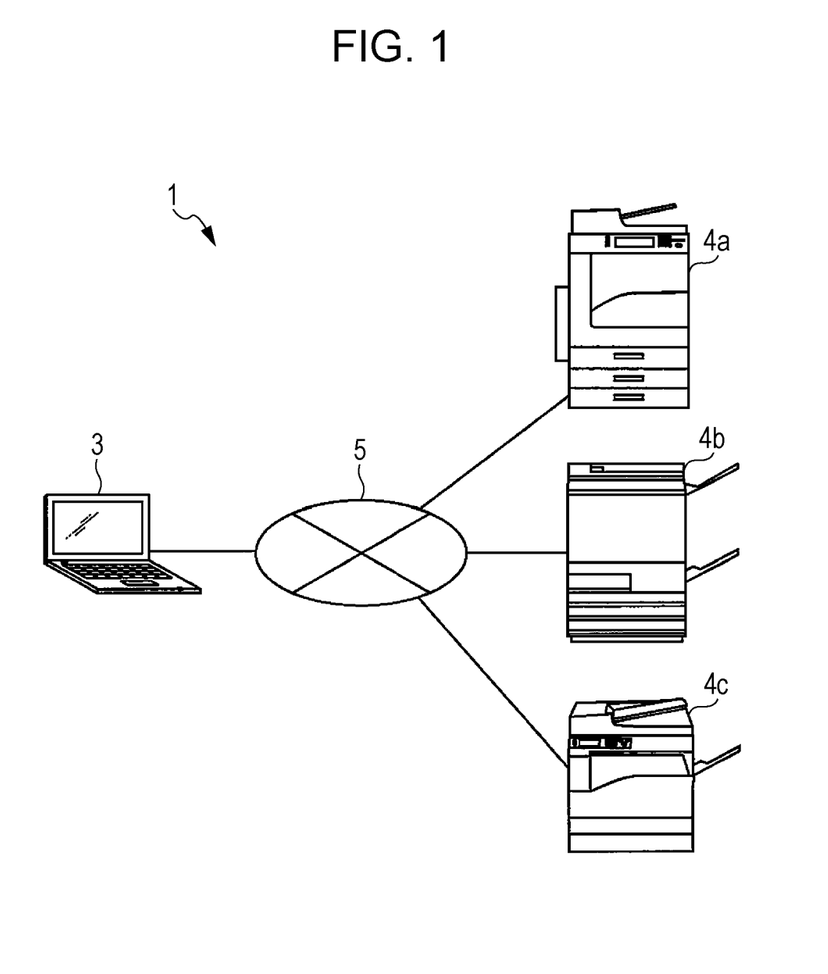
FIG. 1 schematically illustrates the configuration of a print instruction system according to a first exemplary embodiment of the present invention.

FIG. 1 schematically illustrates the configuration of a print instruction system according to a first exemplary embodiment of the present invention. As illustrated in FIG. 1, a print instruction system 1 according to the first exemplary embodiment includes a terminal apparatus 3, and multiple image forming apparatuses 4a, 4b, and 4c that are connected to each other via a network 5. Although described in more detail later, in the first exemplary embodiment, the terminal apparatus 3 represents an example of a print instruction apparatus.

The terminal apparatus 3 is used by the user. The user creates a print job with the terminal apparatus 3, selects one of the image forming apparatuses 4a, 4b, and 4c, and transfers the print job to the selected image forming apparatus to execute printing. In the following description, the multiple image forming apparatuses 4a, 4b, and 4c will be sometimes generically referred to simply as image forming apparatus 4.

Configuration of Terminal Apparatus

Figure 2:
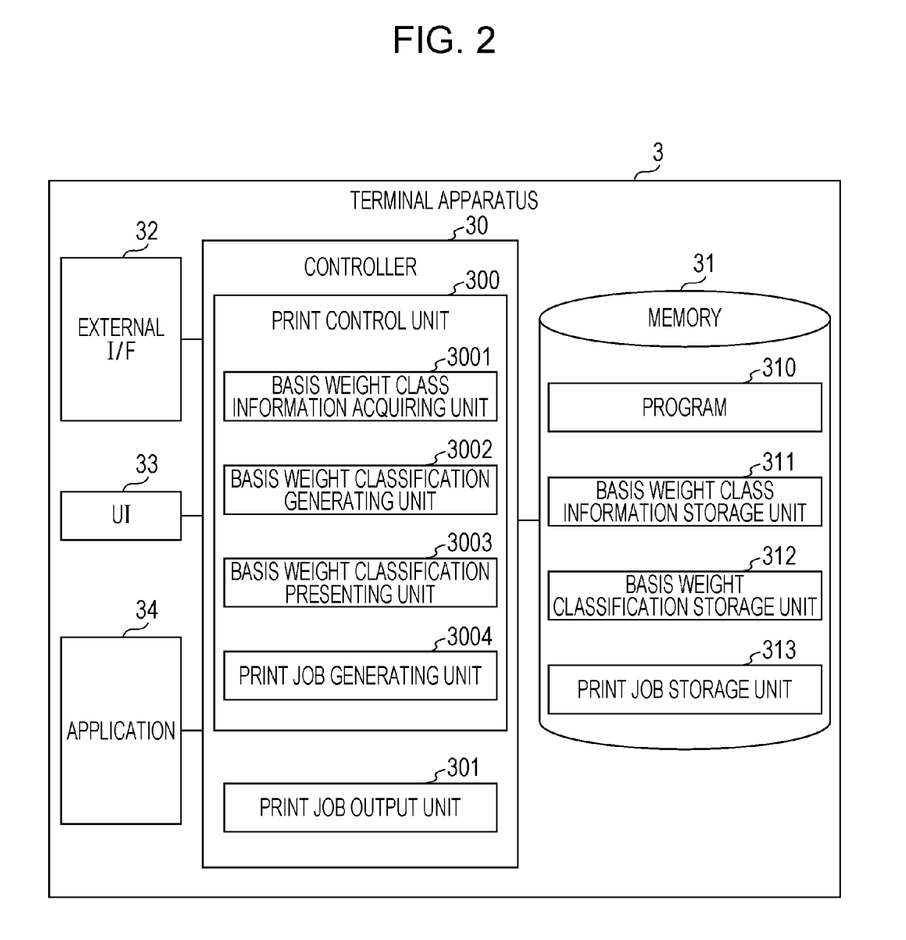
FIG. 2 schematically illustrates the configuration of a terminal apparatus according to the first exemplary embodiment of the present invention.

FIG. 2 schematically illustrates the configuration of a terminal apparatus according to the first exemplary embodiment. As illustrated in FIG. 2, the terminal apparatus 3 according to the first exemplary embodiment includes components such as a controller 30, a memory 31, an external interface (external I/F) 32, a user interface (UI) 33, and an application 34.

The controller 30 is implemented by a CPU or other components. The controller 30 controls various units and executes various programs. The controller 30 includes a print control unit 300 and a print job output unit 301. The print control unit 300 includes a basis weight class information acquiring unit 3001, a basis weight classification generating unit 3002, a basis weight classification presenting unit 3003, and a print job generating unit 3004.

The memory 31 is implemented by a recording medium such as a hard disk or a flash memory, and stores various information. The memory 31 includes components such as a program 310, a basis weight class information storage unit 311, a basis weight classification storage unit 312, and a print job storage unit 313. The program 310 causes the controller 30 to function as the print control unit 300 and the print job output unit 301.

The basis weight class information acquiring unit 3001 acquires, from each of the image forming apparatuses 4, information on basis weight class of recording paper loaded in the image forming apparatus 4. The term "information on basis weight class" as used herein refers to basis weight ranges of recording paper that are set for each individual tray of the image forming apparatus 4, expressed in numerical values such as "90-122 $(g/m^2)$". Hereinafter, information on basis weight class will be also referred to simply as "basis weight class information".

The basis weight classification generating unit 3002 generates, if acquired basis weight classifications for individual image forming apparatuses 4 differ, a basis weight classification common to each of the image forming apparatuses 4, and a basis weight classification obtained by subdividing of the common basis weight classification. In this regard, "subdividing of a basis weight classification" involves further adding, to basis weight classes belonging to the basis weight classification, new basis weight classes to create a subdivided basis weight classification such that the resulting basis weight classification as a whole has no gaps or overlaps between each individual basis weight class.

The basis weight classification presenting unit 3003 presents the user with the generated basis weight classification by displaying the basis weight classification on the UI 33. In other words, the basis weight classification presenting unit 3003 corresponds to a presenting unit that presents the user with a generated common basis weight classification and a basis weight classification obtained by subdividing the common basis weight classification. As described above, the terminal apparatus 3 having the print control unit 300 that includes the basis weight class information acquiring unit 3001, the basis weight classification generating unit 3002, and the basis weight classification presenting unit 3003 represents an example of a print instruction apparatus.

The print job generating unit 3004 generates a print job. The print job output unit 301 outputs the generated print job to the image forming apparatus 4.

Configuration of Image Forming Apparatus

Figure 3:
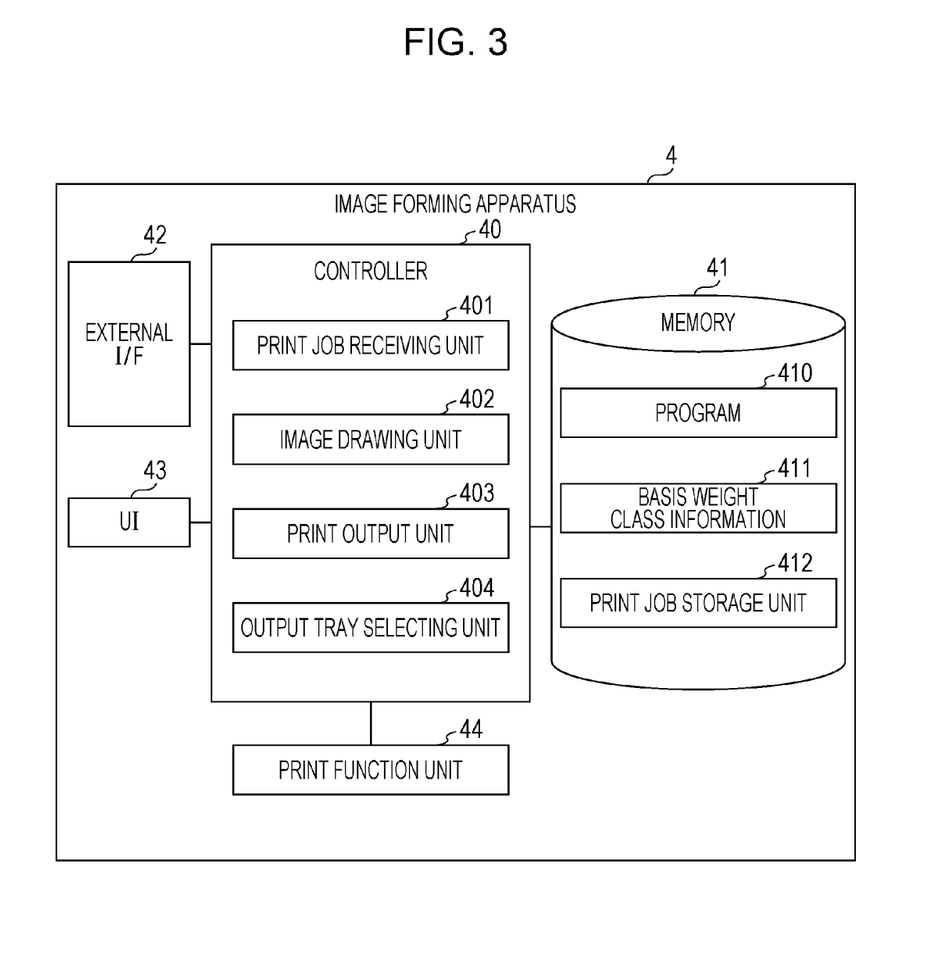
FIG. 3 schematically illustrates the configuration of an image forming apparatus according to the first exemplary embodiment of the present invention.

FIG. 3 schematically illustrates the configuration of the image forming apparatus 4 according to the first exemplary embodiment of the present invention. As illustrated in FIG. 3, the image forming apparatus 4 includes components such as a controller 40, a memory 41, an external interface (external I/F) 42, a user interface (UI) 43, and a print function unit 44.

The controller 40 is implemented by a CPU or other components. The controller 40 controls various units and executes various programs. The controller 40 includes components such as a print job receiving unit 401, an image drawing unit 402, a print output unit 403, and an output tray selecting unit 404. The memory 41 includes components such as a program 410, basis weight class information 411, and a print job storage unit 412.

The print job receiving unit 401 receives, via the external I/F 42, a print job transmitted by the user from the terminal apparatus 3. Although described in more detail later, the output tray selecting unit 404 selects a tray in which recording paper corresponding to a basis weight class specified in the print job is loaded.

The image drawing unit 402 creates, in response to an instruction to print, drawing data that can be printed by the print function unit 44. The print output unit 403 outputs the drawing data created by the image drawing unit 402 to the print function unit 44. The print function unit 44 actually prints a print job instructed to be printed. For example, the print function unit 44 prints document data for output on a recording medium such as paper by the electrophotographic system, the inkjet system, or other systems.

Operation of First Exemplary Embodiment

Figure 4:
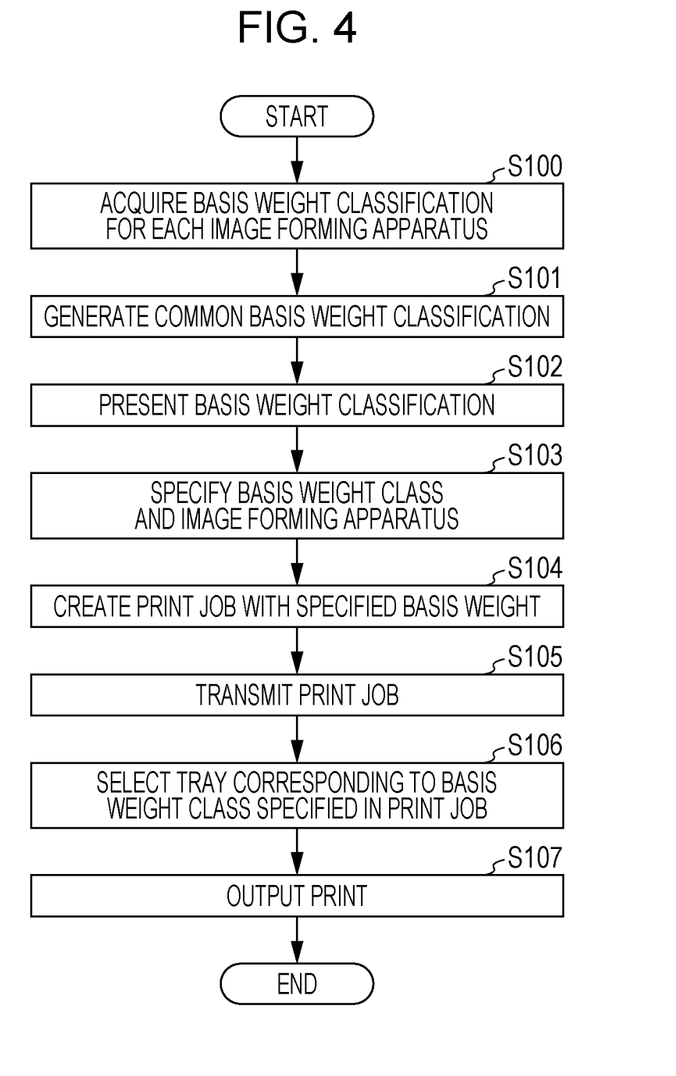
FIG. 4 is a flowchart illustrating an example of operation of the print instruction system according to the first exemplary embodiment.

Next, operation of the print instruction system according to the first exemplary embodiment will be described. FIG. 4 is a flowchart illustrating an example of operation of the print instruction system according to the first exemplary embodiment. Hereinafter, operation according to the first exemplary embodiment will be described with reference to the flowchart of FIG. 4.

First, in response to an instruction given via the UI 33 of the terminal apparatus 3 by a user who attempts to print, the basis weight class information acquiring unit 3001 of the print control unit 300 acquires, from each of the image forming apparatuses 4, basis weight class information on the recording paper loaded in the image forming apparatus 4 (S100). The acquired basis weight class information is stored into the basis weight class information storage unit 311 of the memory 31.

Next, the basis weight classification generating unit 3002 generates a basis weight classification common to each of the image forming apparatuses 4 from the acquired basis weight class information (S101).

Figure 5:
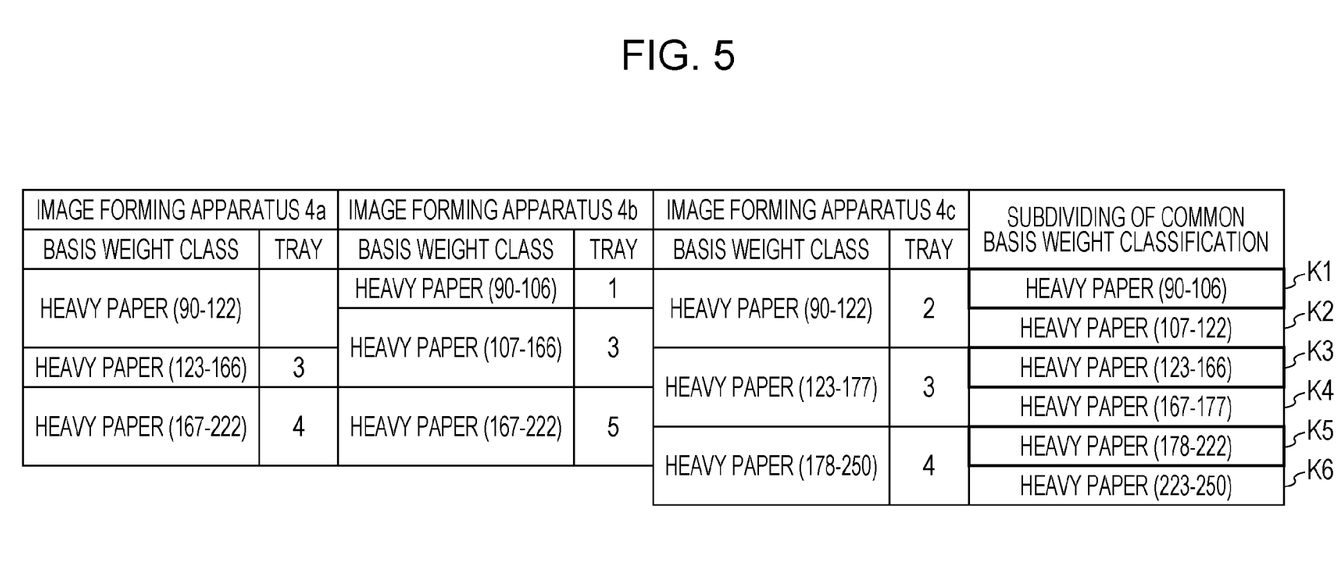
FIG. 5 illustrates an example of creation of a basis weight classification common to each image forming apparatus.

FIG. 5 illustrates an example of creation of a basis weight classification common to each of the image forming apparatuses 4a, 4b, and 4c. As illustrated in FIG. 5, the basis weight classification for the image forming apparatus 4a is divided into the following three classes: Heavy Paper (90-122), Heavy Paper (123-166), and Heavy Paper (167-222). As used herein, the term "basis weight" refers to a unit ($g/m^2$) representing the weight of paper per given unit. For example, typical copy paper has a basis weight that ranges from 64 to 68 ($g/m^2$).

In the image forming apparatus 4a, heavy paper of the basis weight class (123-166) is set for Tray 3, heavy paper of the basis weight class (167-222) is set for Tray 4, and heavy paper of the basis weight class (90-122) is not set for any tray at this point.

The basis weight classification for the image forming apparatus 4b includes Heavy Paper (90-106), Heavy Paper (107-166), and Heavy Paper (167-222). Heavy paper of the basis weight class (90-106) is set for Tray 1, heavy paper of the basis weight class (107-166) is set for Tray 3, and heavy paper of the basis weight class (167-222) is set for Tray 5.

The basis weight classification for the image forming apparatus 4c includes Heavy Paper (90-122), Heavy Paper (123-177), and Heavy Paper (178-250). Heavy paper of the basis weight class (90-122) is set for Tray 2, heavy paper of the basis weight class (123-177) is set for Tray 3, and heavy paper of the basis weight class (178-250) is set for Tray 4.

At this time, a basis weight classification common to each of the image forming apparatuses 4a, 4b, and 4c generated by the basis weight classification generating unit 3002 is made up of the following classes: a basis weight class K1 corresponding to Heavy Paper (90-106), a basis weight class K3 corresponding to Heavy Paper (123-166), and a basis weight class K5 corresponding to Heavy Paper (178-222).

Further, subdividing the range between 90 and 251, which are respectively the smallest and largest basis weights in this case, without leaving any gaps or overlaps between each individual basis weight class yields basis weight classes K1 to K6 including the following basis weight classes added to the above-mentioned common basis weight classification: a basis weight class K2 corresponding to Heavy Paper (107-122), a basis weight class K4 corresponding to Heavy Paper (167-177), and a basis weight class K6 corresponding to Heavy Paper (223-250).

The generated common basis weight classification or subdivided common basis weight classification is presented to the user via the UI 33 (S102).

Figure 6:
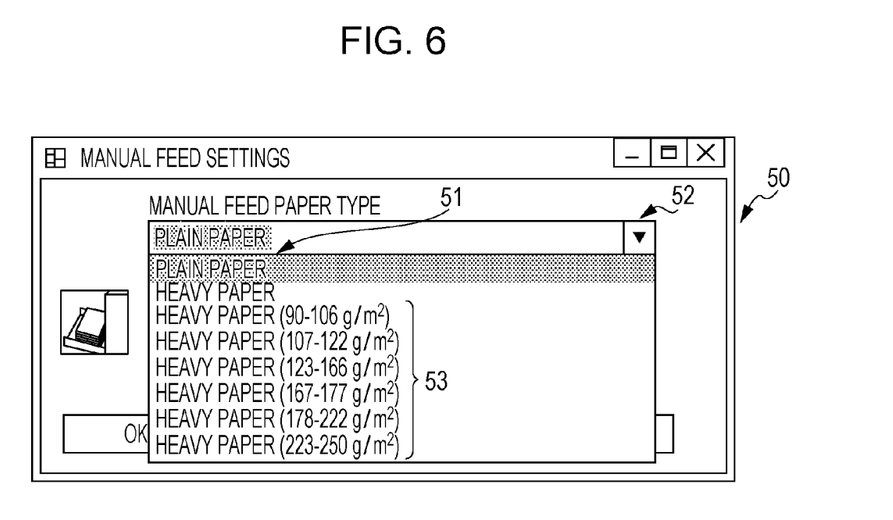
FIG. 6 illustrates an example of a display screen of an UI used for the user to specify a basis weight class.

Next, the user specifies a basis weight class and an image forming apparatus by use of the UI 33 (S103). FIG. 6 illustrates an example of a display screen of the UI 33 used for the user to specify a basis weight class. It is assumed now that the user sets manual feed paper to perform printing on heavy paper.

A display screen 50 of the UI 33 in FIG. 6 displays a settings screen for manual feed. Now, plain paper 51 is being set as the type of manual feed paper. Clicking a button 52 on the right displays a screen 53 showing the subdivided classes K1 to K6 generated as described above. Although the screen 53 includes, in particular, a choice simply called "Heavy Paper" at the top with no basis weight class specified, this will be described later. Now, it is assumed that, for example, the user has specified the basis weight class K4 representing Heavy Paper (167-177).

Figure 7:
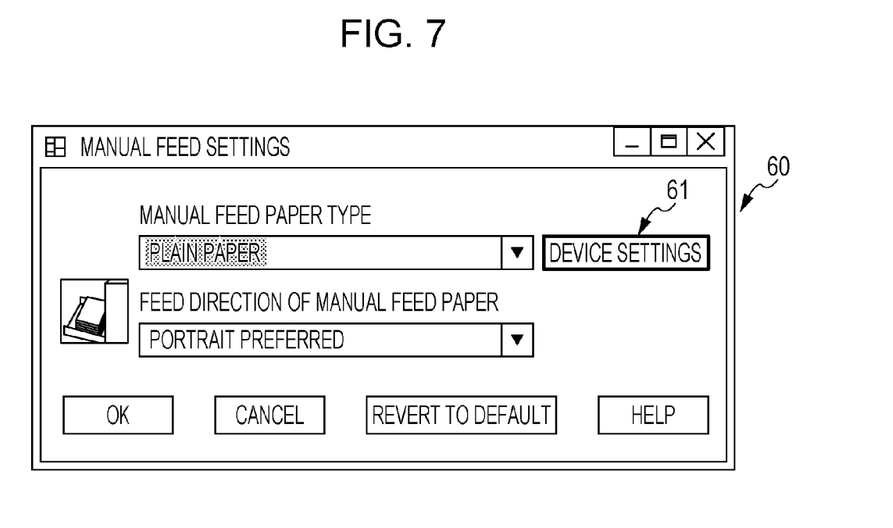
FIG. 7 illustrates an example of a display screen of the UI used for the user to specify an image forming apparatus.
Figure 8:
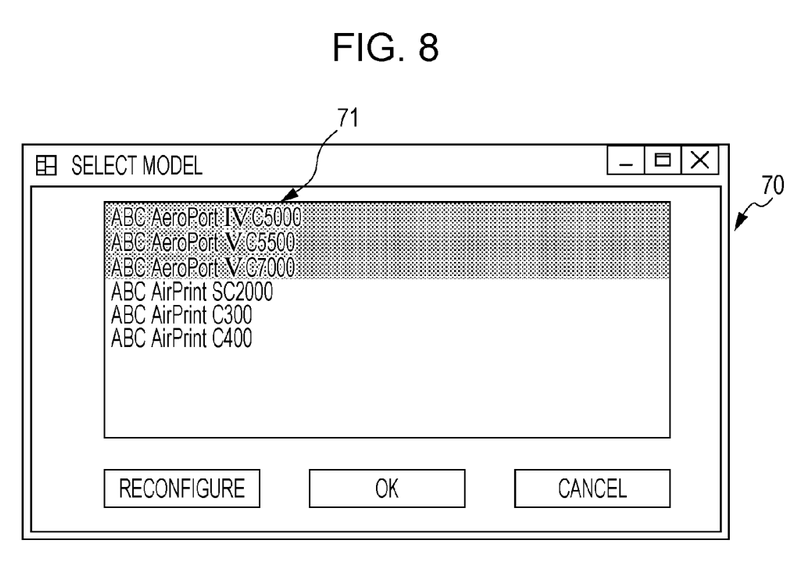
FIG. 8 illustrates an example of a display screen of the UI used for the user to select an image forming apparatus.

FIG. 7 illustrates a display screen of the UI 33 used for specifying one of the image forming apparatuses 4a to 4c. Pressing a Device Settings button 61 on a display screen 60 illustrated in FIG. 7 displays a display screen 70 used for selecting device type as illustrated in FIG. 8. The user selects one of three valid device types 71 among device types displayed on the display screen 70 to thereby specify one image forming apparatus from among the image forming apparatuses 4a to 4c. Now, suppose that the user has specified the image forming apparatus 4a.

The print job generating unit 3004 generates a print job including the basis weight class K4 specified by the user (S104). The print job output unit 301 transmits the generated print job to the image forming apparatus 4a (S105).

When the print job receiving unit 401 of the image forming apparatus 4a receives the print job, drawing data is generated by the image drawing unit 402, and the generated drawing data is output to the print function unit 44 by the print output unit 403. At this time, the output tray selecting unit 404 associates Heavy Paper (167-222), which is a basis weight class set for the image forming apparatus 4a, with the basis weight class K4 representing Heavy Paper (167-177) specified in the print job (S106). Thus, Tray 4 is selected. Then, printing is performed with appropriate parameters (S107).

Second Exemplary Embodiment

Next, a second exemplary embodiment of the present invention will be described. The second exemplary embodiment represents application of the present invention to so-called on-demand print systems that output, in response to a print request from the printer, a print job temporarily stored in a server or other storage devices. Such a system features a server that, even when a mix of different models of printers exists, provides centralized management of their print drivers, thus facilitating use of multiple printers by each user. With such a system, however, it is often the case that the printer model to which to output a print is undetermined at the start of printing, and the basis weight classifications set for individual models differ. The second exemplary embodiment is aimed at presenting the user with an appropriate basis weight classification in such a case.

Configuration of Print Instruction System

Figure 9:
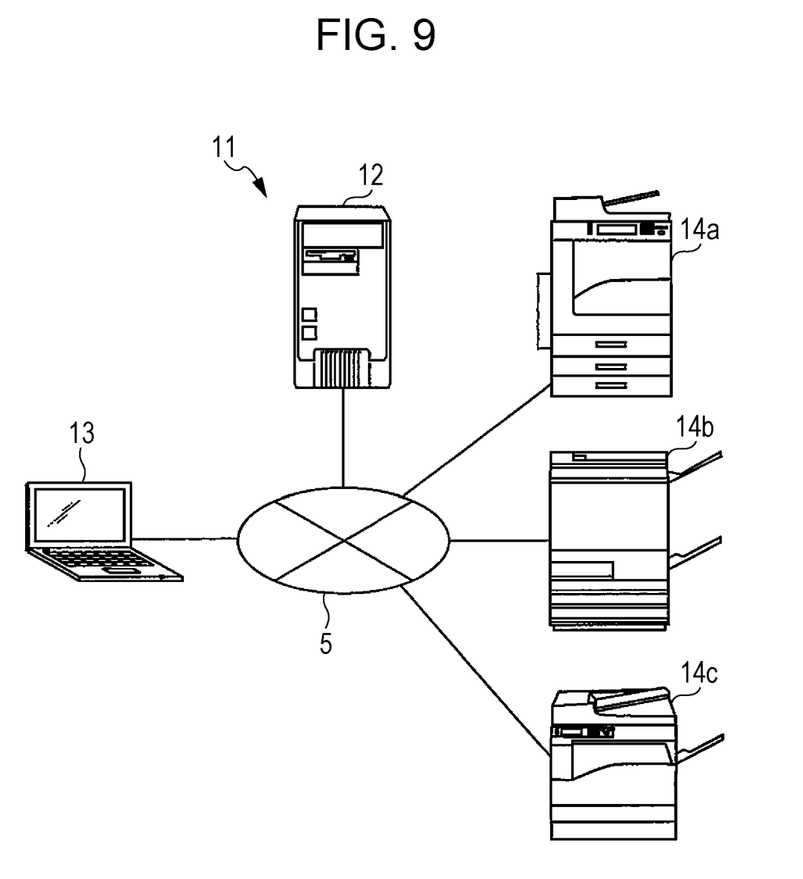
FIG. 9 schematically illustrates the configuration of a print instruction system according to a second exemplary embodiment of the present invention.

FIG. 9 schematically illustrates the configuration of a print instruction system according to the second exemplary embodiment of the present invention. As illustrated in FIG. 9, a print instruction system 11 according to the second exemplary embodiment includes the following components connected by the network 5: an information processing apparatus 12, a terminal apparatus 13, and multiple image forming apparatuses 14a, 14b, and 14c. In the following description, the multiple image forming apparatuses 14a, 14b, and 14c will be sometimes generically referred to simply as image forming apparatus 14. In the second exemplary embodiment, the information processing apparatus 12 represents an example of a print instruction apparatus.

The terminal apparatus 13 is used by each user. The information processing apparatus 12 transfers a print job transmitted from the terminal apparatus 13 of the user to the image forming apparatus 14 that is available for use by the user. Each of the image forming apparatuses 14 receives a print job from the information processing apparatus 12 to perform printing.

Configuration of Information Processing Apparatus

Figure 10:
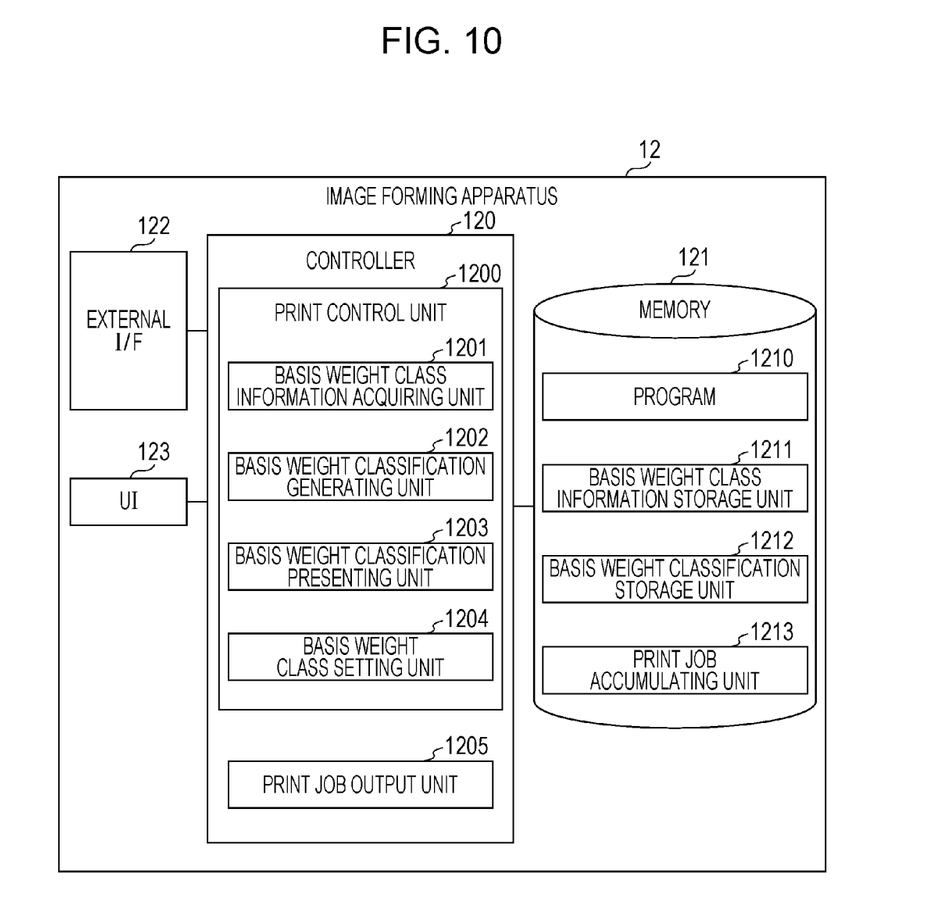
FIG. 10 schematically illustrates the configuration of an information processing apparatus according to the second exemplary embodiment of the present invention.

FIG. 10 schematically illustrates the configuration of the information processing apparatus 12 according to the second exemplary embodiment. As illustrated in FIG. 10, the information processing apparatus 12 includes components such as a controller 120, a memory 121, an external I/F 122, and a UI 123.

The controller 120 is implemented by a CPU or other components. The controller 120 controls various units and executes various programs. The controller 120 includes a print control unit 1200 and a print job output unit 1205. The print control unit 1200 includes a basis weight class information acquiring unit 1201, a basis weight classification generating unit 1202, a basis weight classification presenting unit 1203, and a basis weight class setting unit 1204.

The memory 121 is implemented by a recording medium such as a hard disk or a flash memory, and stores various information. The memory 121 includes components such as a program 1210, a basis weight class information storage unit 1211, a basis weight classification storage unit 1212, and a print job accumulating unit 1213. The program 1210 causes the controller 120 to function as the print control unit 1200, the print job output unit 1205, and other components.

The external I/F 122 communicates with the terminal apparatus 13, the image forming apparatus 14, and other external equipment via the network 5.

The basis weight class information acquiring unit 1201 acquires, from each of the image forming apparatuses 4, information on basis weight class of the recording paper loaded in the image forming apparatus 14. The basis weight classification generating unit 1202 generates, if acquired basis weight classifications for individual image forming apparatuses 14 differ, a basis weight classification common to each of the image forming apparatuses 14, and a basis weight classification obtained by subdividing the common basis weight classification. The basis weight classification presenting unit 1203 presents the user with the generated basis weight classification by transmitting the basis weight classification to the terminal apparatus 3. That is, the print control unit 1200 including the basis weight class information acquiring unit 1201, the basis weight classification generating unit 1202, and the basis weight classification presenting unit 1203 is disposed in the information processing apparatus 12. Thus, in the second exemplary embodiment, the information processing apparatus 12 represents an example of a print instruction apparatus.

The basis weight class setting unit 1204 sets, for a print job, a basis weight class selected by the user. The print job output unit 1205 transmits a print job that has been instructed to be printed by the image forming apparatus 14, to the corresponding image forming apparatus 14.

The basis weight class information storage unit 1211 of the memory 121 stores the basis weight class information acquired by the basis weight class information acquiring unit 1201. The basis weight classification storage unit 1212 also stores the basis weight classification common to each of the image forming apparatuses 14 generated by the basis weight classification generating unit. The print job accumulating unit 1213 accumulates a print job transmitted from the terminal apparatus 13.

Configuration of Terminal Apparatus

Figure 11:
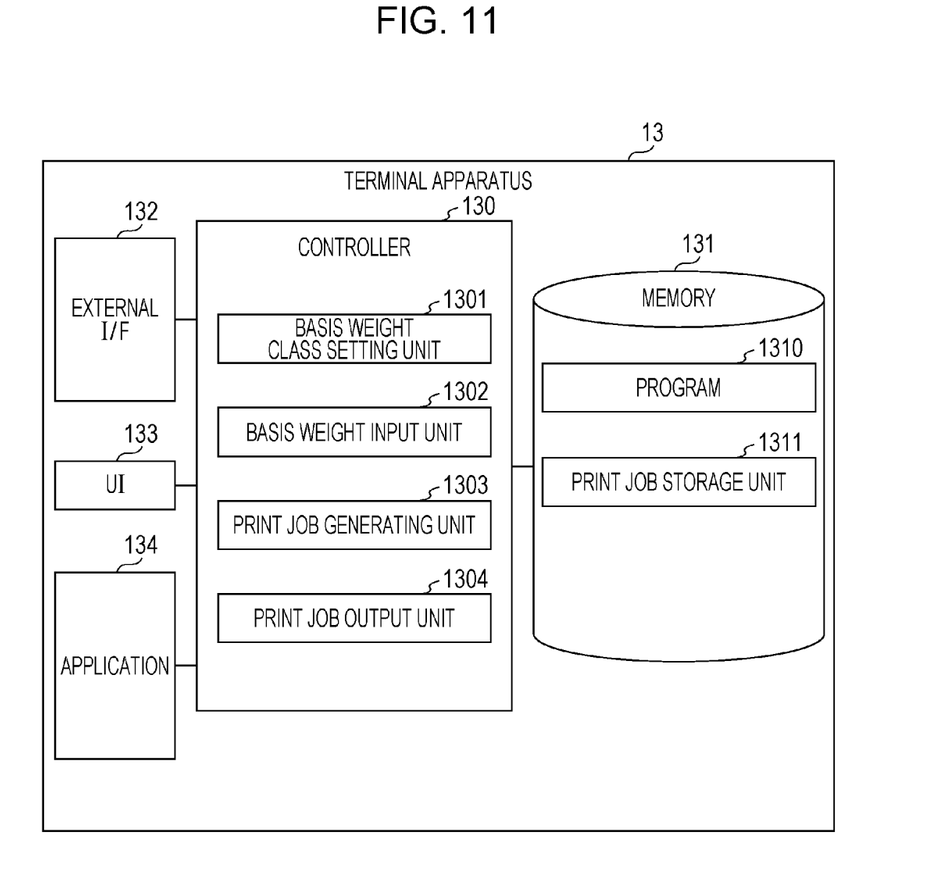
FIG. 11 schematically illustrates the configuration of a terminal apparatus according to the second exemplary embodiment of the present invention.

FIG. 11 schematically illustrates the configuration of the terminal apparatus 13 according to the second exemplary embodiment of the present invention. As illustrated in FIG. 11, the terminal apparatus 13 includes a controller 130, a memory 131, an external I/F 132, a UI 133, and an application 134.

The controller 130 includes components such as a basis weight class setting unit 1301, a basis weight input unit 1302, a print job generating unit 1303, and a print job output unit 1304. The memory 131 includes components such as a program 1310 and a print job storage unit 1311.

The basis weight class setting unit 1301 is used by the user to set, via the UI 133, a basis weight class for recording paper on which the user attempts to print. The basis weight input unit 1302 is used by the user to directly enter a numerical value representing a basis weight of recording paper via the UI 133.

Configuration of Image Forming Apparatus

Figure 12:
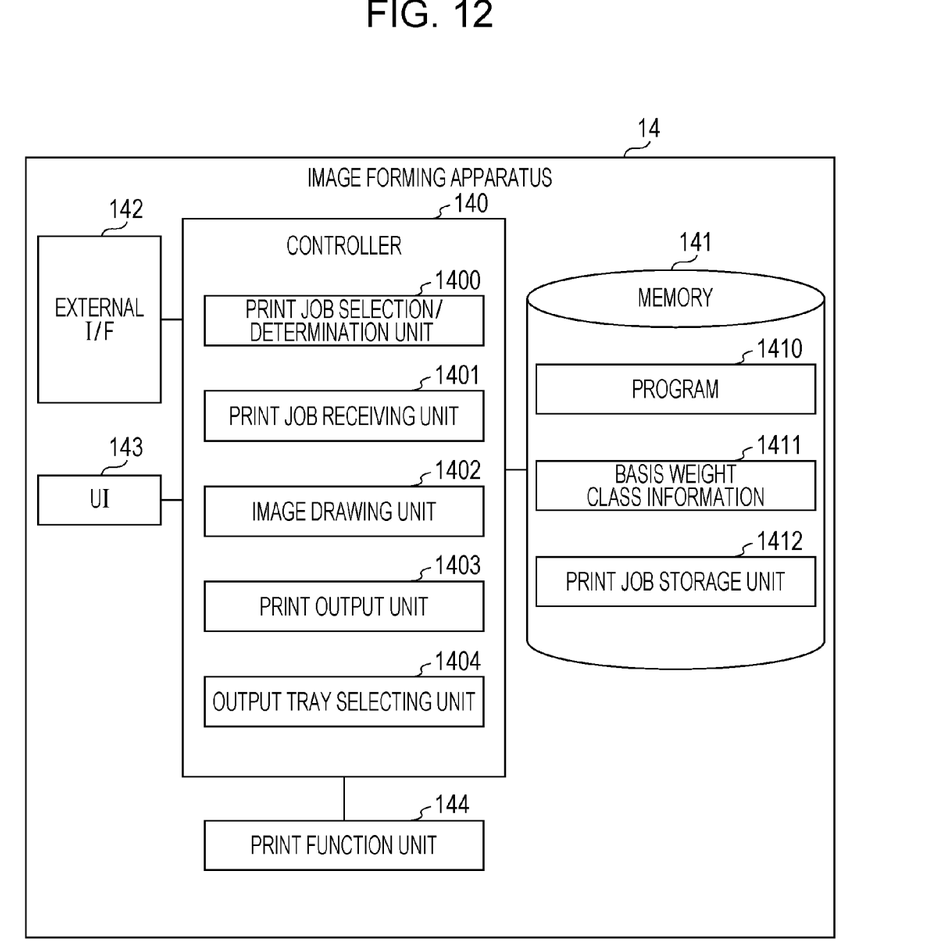
FIG. 12 schematically illustrates the configuration of an image forming apparatus according to the second exemplary embodiment of the present invention.

FIG. 12 schematically illustrates the configuration of an image forming apparatus according to the second exemplary embodiment of the present invention. As illustrated in FIG. 12, the image forming apparatus 14 includes a controller 140, a memory 141, an external I/F 142, a UI 143, and a print function unit 144.

The controller 140 includes a print job selection/determination unit 1400, a print job receiving unit 1401, an image drawing unit 1402, a print output unit 1403, and an output tray selecting unit 1404. The memory 141 includes a program 1410, basis weight class information 1411, and a print job storage unit 1412.

Although the image forming apparatus 14 according to the second exemplary embodiment is of substantially the same configuration as the image forming apparatus 4 according to the first exemplary embodiment mentioned above, the second exemplary embodiment differs from the first exemplary embodiment in that the controller 140 includes the print job selection/determination unit 1400 that is used by the user to specify, from the image forming apparatus 14, a print job to be printed from among print jobs accumulated in the information processing apparatus 12.

Operation of Second Exemplary Embodiment

Figure 13:
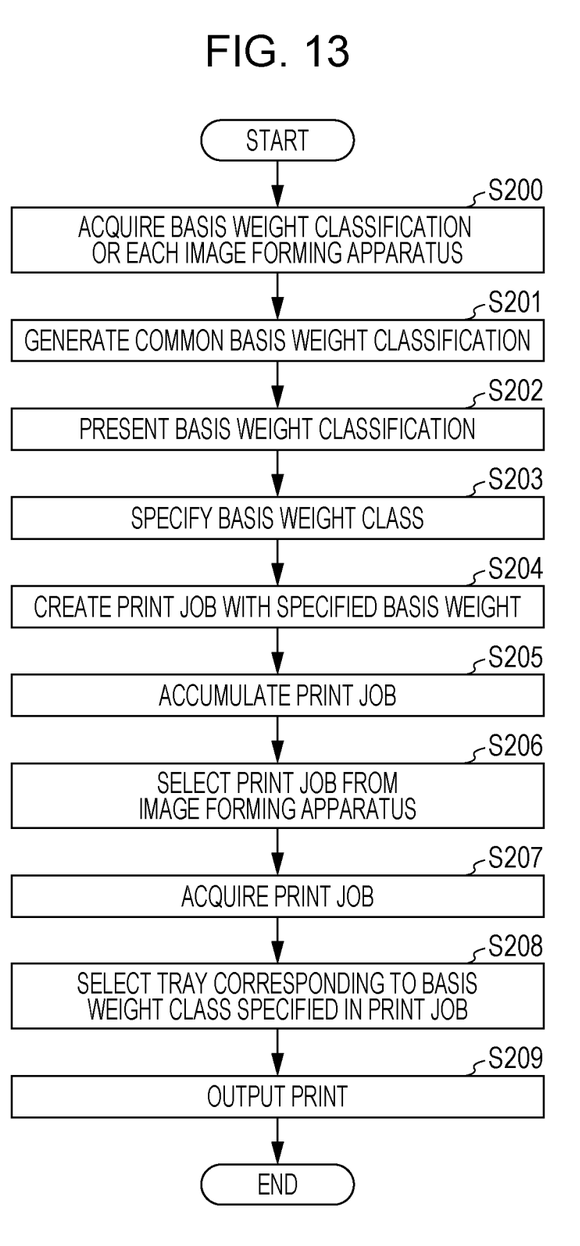
FIG. 13 is a flowchart illustrating an example of operation of the print instruction system according to the second exemplary embodiment.

Next, operation of the print instruction system according to the second exemplary embodiment will be described. FIG. 13 is a flowchart illustrating an example of operation of the print instruction system according to the second exemplary embodiment. Hereinafter, operation according to the second exemplary embodiment will be described with reference to the flowchart of FIG. 13.

First, when the user gives an instruction via the UI 133 of the terminal apparatus 13, the instruction is transmitted to the information processing apparatus 12 via the external I/F 132, and the basis weight class information acquiring unit 1201 of the print control unit 1200 acquires, from each of the age forming apparatuses 14, basis weight class information on the recording paper loaded in the image forming apparatus 14 (S200). The acquired basis eight class information is stored into the basis weight class information storage unit 1211 of the memory 121.

Next, the basis weight classification generating unit 1202 generates a basis weight classification common to each of the image forming apparatuses 14 from the acquired basis weight class information (S201). It is assumed that the basis weight classes set for the image forming apparatuses 14a, 14b, and 14c are respectively the same as those for the image forming apparatuses 4a, 4b, and 4c according to the first exemplary embodiment mentioned above, and the common basis weight classification generated at this time is also the same as that illustrated in FIG. 5.

Next, the basis weight classification presenting unit 1203 transmits the generated common basis weight classification or subdivided common basis weight classification to the terminal apparatus 13 via the external I/F 122, and presents the generated basis weight classification to the user via the UI 133 of the terminal apparatus 13 (S202).

Next, the user specifies a basis weight class by use of the UI 133 (S203). The specifying of a basis weight class is also performed in the same manner as in the first exemplary embodiment. For example, it is assumed in this case that the basis weight class K4 representing Heavy Paper (167-177) has been specified by the user on the display screen of the UI 133 illustrated in FIG. 6.

The print job generating unit 1303 generates a print job with the basis weight class K4 thus specified (S204). The generated print job is transmitted by the print job output unit 1304 to the information processing apparatus 12 via the external I/F 132, and accumulated in the print job accumulating unit 1213 (S205).

Next, to actually perform printing, the user selects, from the print job election/determination unit 1400 of the image forming apparatus 14a, a print job to be printed from among print jobs accumulated in the information processing apparatus 12, via the UI 123 (S206).

Then, the print job is acquired from the information processing apparatus 12 by the print job receiving unit 1401 of the image forming apparatus 14a (S207). Drawing data is generated from the acquired print job by the image drawing unit 1402, and the generated drawing data is output to the print function unit 144 by the print output unit 1403. At this time, the output tray selecting unit 1404 associates Heavy Paper (167-222), which is a basis weight class set for the image forming apparatus 14a, with the basis weight class K4 representing Heavy Paper (167-177) specified in the print job (S208). Thus, Tray 4 is selected. Then, printing is performed with appropriate parameters (S209).

The preceding description of the exemplary embodiments is directed to a case in which, as illustrated in FIG. 6, for example, the user specifies a basis weight class for a print job by specifying, from the basis weight classification being presented, a basis weight class with the corresponding basis weight range specifically indicated. Alternatively, the user may specify the class simply named "Heavy Paper" with no basis weight class specified, which is displayed at the top of the screen 53 in FIG. 6.

When the user instructs printing to be performed while specifying "Heavy Paper" with no basis weight class specified as described above, a print job with no specification of heavy paper basis weight is created. In this regard, for the image forming apparatus 4 that has received the print job with no specification of heavy paper basis weight, priorities to be assigned when the basis weight of heavy paper is not specified are registered. Thus, processing is performed in accordance with the registered priorities at this time.

For example, it is assumed that for the image forming apparatus 4a with basis weight classes set as illustrated in FIG. 5, Tray 3 for which Heavy Paper (123-166) is set has a priority of 1, and Tray 4 for which Heavy Paper (167-222) is set has a priority of 2.

Assuming that the image forming apparatus 4a has received a print job at this time, "Heavy Paper" with no specification of basis weight is set to Heavy Paper (123-166)

based on the priorities mentioned above, and printed and output from Tray 3 in accordance with appropriate parameters.

The above-mentioned priorities may not necessarily be set on the side of the image forming apparatus 4. The priorities may be allowed to be set on the side of the print control unit 1200 or 300. If the priorities are set on the side of the print control unit 1200 or 300, the priorities override those set on the side of the image forming apparatus 4.

The priorities mentioned above may be determined for individual trays of each of the image forming apparatuses 4, or may be determined in order of decreasing number of sheets remaining in the tray.

When the common basis weight classification generated by the basis weight classification generating unit 1202 or 3002 is to be presented, a subdivided basis weight classification may be displayed in the manner of the screen 53 illustrated in FIG. 6, or the basis weight classes K1, K3, and K5 common to each of the image forming apparatuses 4a, 4b, and 4c may be displayed.

Further, as illustrated in FIG. 7, the type of manual feed paper may be specified after the image forming apparatus 4 is specified. At this time, only the basis weight classes of heavy paper set for the specified image forming apparatus 4 may be displayed.

Modification

Next, a modification of the second exemplary embodiment will be described. According to this modification, rather than selecting a basis weight class from a presented common basis weight classification as in the second exemplary embodiment mentioned above, the user directly enters a numerical value representing a basis weight.

At step S203 of the flowchart in FIG. 13, when the user specifies a basis weight class from, for example, the common basis weight classification as illustrated in FIG. 6 via the UI 133, the user does not select a basis weight class from the common basis weight classification presented as described above but directly enters a numerical value representing a basis weight.

Presumably, this corresponds to when, for example, the user knows the basis weight of recording paper on which to print. In this case, the user directly enters a numerical value representing a basis weight from the basis weight input unit 1302 via the UI 133.

The basis weight input unit 1302 passes the entered basis weight value to the print job generating unit 1303. The print job generating unit 1303 generates a print job with the basis weight value set as describe above. The print job with the set basis weight value is transmitted to the information processing apparatus 12, and accumulated in the print job accumulating unit 1213 of the information processing apparatus 12.

When the user performs printing, an instruction to print is issued to the information processing apparatus 12 from the image forming apparatus 14, and a target print job is acquired from among print jobs accumulated in the information processing apparatus 12.

At this time, the basis weight class information acquiring unit 1201 of the information processing apparatus 12 acquires basis weight class information for the image forming apparatus 14 that has issued the instruction to print. The basis weight class setting unit 1204 sets an appropriate basis weight class corresponding to basis weight value set in the print job. For example, if there is any basis weight class containing the entered basis weight value, such a basis weight class is set. If there is no basis weight class containing the entered basis weight value the basis weight class closest in value to the basis weight value is set. Alternatively, a determination not to print may be made if there is no basis weight class containing the entered basis weight value, and an indication to that effect is presented to the user.

The setting of an appropriate basis weight class corresponding to a basis weight value set in a print job may be performed not on the side of the information processing apparatus 12 but on the side of the image forming apparatus 14, by providing the image forming apparatus 14 with a basis weight class setting unit that sets a basis weight class corresponding to a basis weight value.

The preceding description is directed to a case in which the information processing apparatus 12 acquires basis weight class information for the image forming apparatus 14 after receiving an instruction to print from the image forming apparatus 14. In alternative exemplary embodiments, the information processing apparatus 12 acquires basis weight class information from each of the image forming apparatuses 14 and stores the acquired basis weight class information in the basis weight class information storage unit 1211 in advance, and when an instruction to print is issued, the information processing apparatus 12 acquires, from the basis weight class information storage unit 1211, basis weight class information for the image forming apparatus 14 that has issued the instruction to print.

For a print job for which a basis weight class corresponding to a directly entered basis weight value has been set, a tray corresponding to the basis weight class is selected by the output tray selecting unit 1404, and printing is performed in the print function unit 144 by using appropriate print control parameters.

The basis weight input unit 1302 that receives a direct input of a basis weight value may allow the value to be left unentered. In that case, the basis weight class setting unit 1204 of the information processing apparatus 12 that has received, from the image forming apparatus 14, an instruction to print a print job with an unentered basis weight value may cause the user to specify a basis weight.

As described above, with the print instruction system 11 according to the second exemplary embodiment, the basis weight classification generating unit 1202 of the information processing apparatus 12 generates a basis weight classification common to each of the image forming apparatuses 14, and the generated common basis weight classification is stored in the basis weight classification storage unit 1212.

When there has been a change in device model composition due to, for example, addition of a new model of image forming apparatus 14 to the image forming apparatuses 14 connected to the print instruction system 11, a common basis weight classification is generated once again by acquiring basis weight classes each of the image forming apparatuses 14. At this time, if the common basis weight classification generated again has changed from the stored common basis weight classification mentioned above, the specification of basis weight stored as mentioned above may be changed to a state in which no value is entered.

Although exemplary embodiments of the present invention have been described above, the present invention is not limited to the above-mentioned exemplary embodiments but various modifications are possible without departing from the scope of the present invention. For example, although the foregoing description of the exemplary embodiments is directed to a case in which the program 310 is stored in the memory 31 of the terminal apparatus 3 and the program 1210 is stored in the memory 121 of the information processing apparatus 12, the program 310 or 1210 may be provided by being stored on a recording medium such as a CD-ROM.

Each unit constituting the controller 30 or 120 may be implemented in part or whole by a hardware circuit such as a field programmable gate array (FPGA) or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print instruction apparatus comprising:
a processor programmed to:
acquire basis weight class information from a plurality of image forming apparatuses to be selected, the basis weight class information representing information on basis weight class of recording paper set for each of the plurality of image forming apparatuses;
generate a common basis weight classification from the acquired basis weight class information, the common basis weight classification including at least one basis weight class common to the plurality of image forming apparatuses; and
generate a subdivided basis weight classification including a plurality of basis weight classes,
the subdivided basis weight classification being obtained by subdividing the common basis weight classification into at least one first basis weight class, and adding, to the at least one first basis weight class, at least one second basis weight class such that, the plurality of basis weight classes has no gap or overlap between each of the plurality of basis weight classes; and
a user interface including a display that displays to a user at least one basis weight class, of the plurality of basis weight classes, the at least one basis weight class including at least either the generated common basis weight or the generated subdivided basis weight classification, the user interface being configured to allow the user to select at least one of the displayed basis weight classes,
wherein the processor is further programmed to:
select a basis weight class corresponding to a basis weight selected by the user; and
generate a print job using the basis weight selected by the user.

2. The print instruction apparatus according to claim 1,
wherein the display displays to the user at least one of the plurality of image forming apparatuses, and the user interface is further configured to allow the user to select at least one of the plurality of image forming apparatuses, and
wherein the processor is further programmed to:
(i) select one of the plurality of image forming apparatuses corresponding to an image forming apparatus selected by the user; and
(ii) generate the print job using the selected image forming apparatus.

3. A non-transitory computer readable medium storing a program causing a computer to execute a process, the process comprising:
acquiring basis weight class information from a plurality of image forming apparatuses to be selected, the basis weight class information representing information on basis weight class of recording paper set for each of the plurality of image forming apparatuses;
generating a common basis weight classification from the acquired basis weight class information, the common basis weight classification including at least one basis weight class common to the plurality of image forming apparatuses;
generating a subdivided basis weight classification including a plurality of basis weight classes,
the subdivided basis weight classification being obtained by subdividing the common basis weight classification into at least one first basis weight class, and adding, to the at least one first basis weight class, at least one second basis weight class such that, the plurality of basis weight classes has no gap or overlap between each of the plurality of basis weight classes; and
causing a user interface including a display to display to a user at least one basis weight class, of the plurality of basis weight classes, the at least one basis weight class including at least either the generated common basis weight or the generated subdivided basis weight classification, the user interface being configured to allow the user to select at least one of the displayed basis weight classes;
selecting a basis weight class corresponding to a basis weight selected by the user; and
generating a print job using the basis weight selected by the user.

* * * * *